United States Patent [19]

Genest et al.

[11] E Re. 29,846

[45] Reissued Nov. 28, 1978

[54] ELECTRONIC COMBINATION LOCK AND SYSTEM

[75] Inventors: Leonard J. Genest, Huntington Beach; Frederick E. Feagin, Tustin; Sylvan Cole, Los Angeles; Daryle Messner, Buena Park, all of Calif.

[73] Assignee: Monitron Industries, Inc., Santa Ana, Calif.

[21] Appl. No.: 860,424

[22] Filed: Dec. 14, 1977

Related U.S. Patent Documents

Reissue of:

[64] Patent No.: 3,926,021
Issued: Dec. 16, 1975
Appl. No.: 430,247
Filed: Jan. 2, 1974

[51] Int. Cl.[2] ..... E05B 49/02

[52] U.S. Cl. ..... 70/278; 70/280; 235/449; 340/149 R; 361/172

[58] Field of Search ..... 70/277, 278, 279, 280; 317/134; 235/61.11, 61.12, 61.7; 340/149 R

[56] References Cited

U.S. PATENT DOCUMENTS

| | | | |
|---|---|---|---|
| 463,297 | 11/1891 | Starrett | 70/280 |
| 608,321 | 8/1898 | Carleton | 292/144 |
| 1,938,150 | 12/1933 | Marateck | 70/278 |
| 3,625,033 | 12/1971 | Subieta | 70/278 |
| 3,787,812 | 1/1974 | Armstrong | 340/164 R |
| 3,800,284 | 3/1974 | Zucker | 340/149 R |
| 3,821,704 | 6/1974 | Sabsay | 340/149 A |

*Primary Examiner*—Robert L. Wolfe

[57] ABSTRACT

A unitary self-contained electronic combination lock is provided which includes a dead bolt manually operable from one side and operable from the other side only in response to insertion of a data combination card carrying a unique binary code in the form of selectively positioned metallic spots. Sensors located within the unit generate a binary 1 or 0 signal in response to the presence or absence of a metallic spot adjacent each sensor. The lock combination code is automatically changed to the data card's code upon insertion of a card having a code combination which includes part of the lock's code so that the previously issued cards will no longer operate to unlock the door. In this manner, the authorized code for each lock unit is automatically and independently changed to render inoperative all previously issued data cards.

12 Claims, 12 Drawing Figures

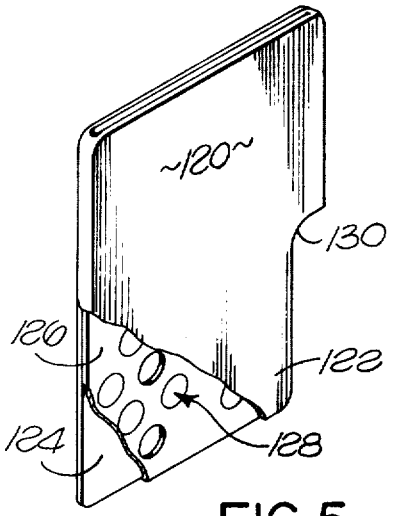
FIG. 5.
FIG. 6.
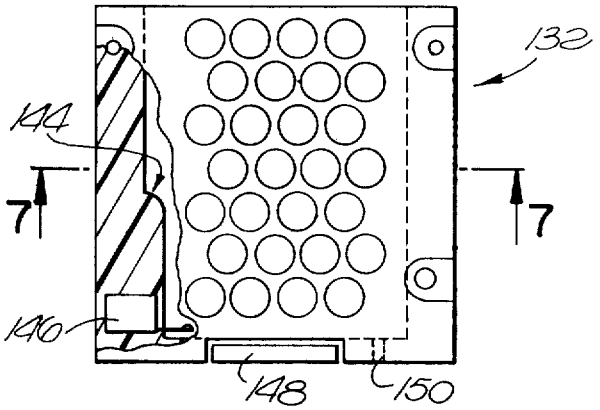
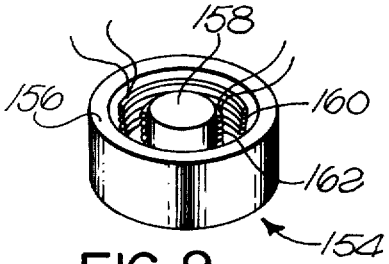
FIG. 8.
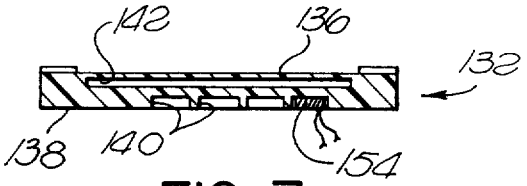
FIG. 7.
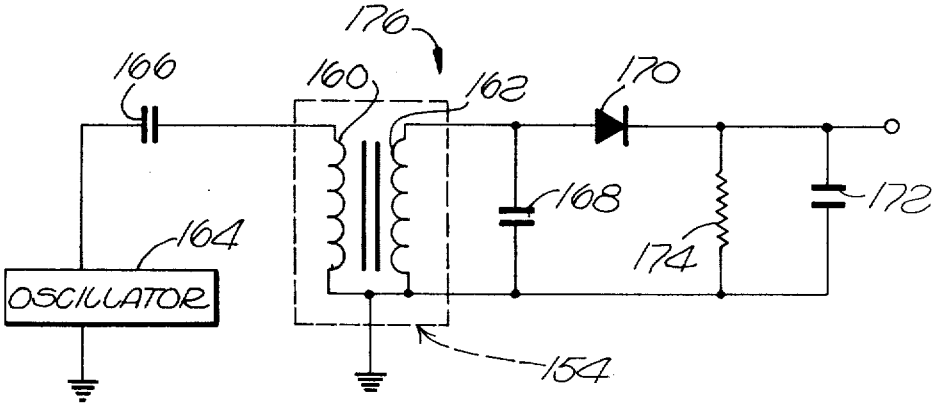
FIG. 9.

ELECTRONIC COMBINATION LOCK AND SYSTEM

Matter enclosed in heavy brackets [ ] appears in the original patent but forms no part of this reissue specification; matter printed in italics indicates the additions made by reissue.

BACKGROUND OF THE INVENTION

This invention relates to an electronic lock system and, more particularly, to an electronic switch for use with a data combination card having a binary code indicator distributed over the surface thereof and operable to actuate a door lock in response to the insertion of the data card in the switch system.

This invention has particular application to use in buildings, such as hotels, having large numbers of rooms required to be locked, and is intended to replace the conventional mechanical lock and key system now in general use. However, it will be understood that the system of this invention could be used with any building or enclosure requiring a locked door, such as safedeposit boxes or automobiles.

In typical electronic systems for controlling entrance to protected areas, a door is provided with an electronic lock which responds to a preselected binary code or combination contained on a key which frequently takes the form of a card. A person wishing to gain entrance through the door inserts his card into a receptacle associated with the lock and the lock circuitry actuates the bolt if the card is correctly coded. Such electronic locks have very significant advantages as compared with conventional lock systems, such as the very large number of code combinations which are available on a card of very small size.

The general inflexibility of the mechanical lock and key systems currently in use prohibits the convenient changing of locks, combinations or key settings. Therefore, a large number of keys are normally issued thus presenting a security problem. Some electronic systems which have attempted to overcome these deficiencies employ a central control unit electrically connected to each of the many individual doors to remotely set and change the individual lock combinations, sense the coding on a card inserted at the various remote door locations, and initiate the bolt action on the remote door locks. One apparent disadvantage of such systems is the susceptibility to failure of all locks if the central control unit is inoperable. In addition, electrically wiring all individual locks to the central control unit is expensive and often inconvenient, especially in older buildings.

In other electronic systems where the central control unit is not employed, the individual lock combinations on each door must be individually changed by manually resetting the switches or changing electrical connections before a new card will operate the lock. Where this system is employed in a hotel, a large expenditure of time by authorized personnel is required each day to change lock combinations for those rooms which are to receive a new occupant.

In addition, the mechanical latch portion of previous electronic lock systems typically requires large amounts of energy to actuate the locks by pulling the bolt back against a spring or the like. Such systems have been considered necessary in the past since it is desirable to employ the conventional rotating handle inside the door to withdraw the bolt without employing a card. The large energy requirements, however, necessitate inconvenient and expensive connection to a high energy source. One solution has been to employ a rotating handle on the outside which will only operate when a correctly coded card is inserted. This, however, defeats the dead bolt feature by providing a mechanical linkage through the outside of the lock which if forceably removed provides a ready means for manually retracting the bolt. Furthermore, such systems frequently do not incorporate a dead bolt feature but employ spring-loaded bolts to allow the bolt to be retracted when the door is being closed and extended again after the door is closed.

SUMMARY OF THE INVENTION

A method of comparing codes inserted into a combination comparator with codes previously stored in an active memory and changing the stored codes in response to a favorable comparison is provided in which first and second codes stored in the active memory are compared with third and fourth codes inserted into the combination comparator. Specifically, the stored second code is compared with the inserted fourth code and if they are identical a match signal is generated. If they are not identical, the stored second code and the inserted third code are compared and if they are identical a match signal is generated and the active memory is changed to replace the previously stored first and second codes with the inserted third and fourth codes respectively.

In one embodiment of the invention, a unitary lock housing is secured in a notch cut into one edge of a door by clamping the door surrounding the notch between an adjustable back plate on the inside of the door and the remainder of the housing. A bolt slidably mounted in the housing reciprocates either upon actuation of a motor in response to insertion into the housing from outside of a correctly coded data combination card or rotation of a door handle mounted on the housing back plate. A pin through the bolt rides in a non-linear slot of a cam which rotates within the housing in response to actuation of either the motor or the door handle. A detent in the non-linear slot prevents inward pressure against the bolt from rotating the cam in either direction when the bolt is fully extended. A spring-loaded catch protruding from the end of the bolt contacts the door jamb when the door is being closed and pushes inwardly against the spring force until the lug engages the bolt receptacle to hold the bolt aligned with the receptacle until the bolt is extended. All of the mechanical elements of the lock are contained behind the outside face of the housing so that the lock's mechanical linkage is not normally accessible from outside the housing.

In one embodiment of the invention, a data combination card carries code information to be inserted into the lock. The data card has a central coded layer secured between two outer layers to form a composite card. The three layers are composed of electrically non-conductive, nonmetallic material with the central layer having a plurality of holes formed therein covered by metal foil on one side. The card is coded by selectively removing spots of metal covering certain of the holes.

A data card reader provided within the lock housing includes a plurality of iron core transformers, each having an alternating current source connected across the transformer first coil to produce a first output signal across the second coil. When a data card is inserted into the card reader, the metal spots in the central layer adjacent corresponding sensor transformers produce a second output signal across the respective transformer second coils to provide a combination code of first and second output signals corresponding to the information encoded on the data card.

Various switches are provided within the housing to detect the fully extended and fully retracted positions of the bolt, the bolt position where only the catch lug is extended, the direction in which the cam has rotated to retract the bolt, and whether the door is closed. Various logic components actuate the motor to retract the bolt when a correctly coded data card is inserted into the card reader. After a data card is removed, or rotation of the handle is completed, the various logic components respond to the bolt position as detected by the various switches to switch on the motor to extend the bolt so that only the catch lug protrudes beyond the edge of the door so that the catch will engage the bolt receptacle when the door is closed. When the door closed condition is detected, the motor is actuated to extend the bolt completely into the bolt receptacle. Batteries within the housing supply the power requirements of the lock and system.

BRIEF DESCRIPTION OF THE DRAWINGS

FIG. 5 is a perspective view of the data combination card employed in the preferred embodiment of the invention with the top two card layers partly broken away;

FIG. 6 is an elevation view of the card reader employed in the preferred embodiment of the invention with the top surface partly broken away;

FIG. 7 is a cross-sectional view taken along line 7—7 of FIG. 6;

FIG. 8 is a perspective view of one of the sensor elements mounted in the card reader of FIGS. 6 and 7;

FIG. 9 is a schematic representation of the sensor element of FIG. 8 and associated circuitry employed in the preferred embodiment of the invention;

DESCRIPTION OF THE INVENTION

The particular embodiment of the invention illustrated and described herein is an electronic lock system for actuating a switch with a data combination card to open a door lock, such as might be employed in the door of a hotel or the like. As will be apparent, however, the principles of the invention are applicable to diverse applications for switching to open and close locks or actuate other devices, such as controlling a beam of light.

The complete system shown and described herein may be considered in five functional sections: the lock, the data combination card, the card reader, the sensors, and the central processing unit. These functional sections are described in order herein to assist in understanding the structure and the interrelated functions of the various sections.

THE LOCK

Figure 1:
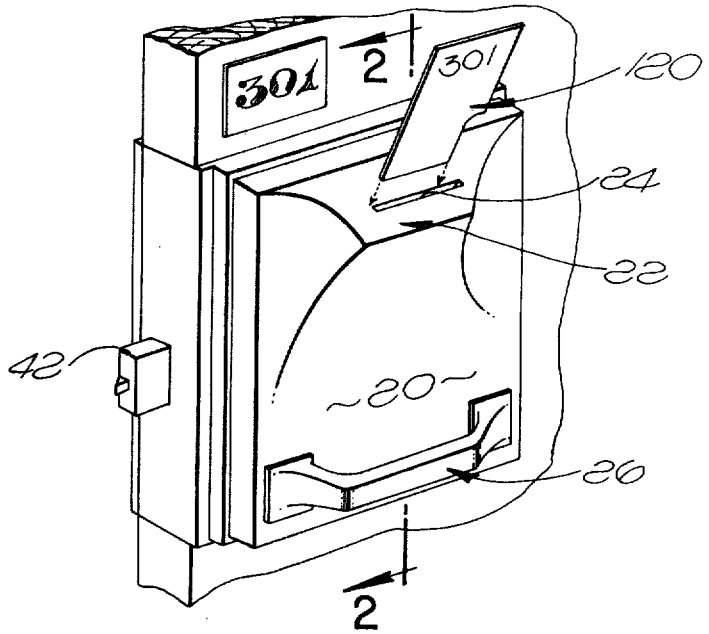
FIG. 1 is a perspective view of the unitary electronic lock and system of this invention installed in a door.

FIG. 1 shows the entire electronic lock system of this invention contained in a unitary housing 20 and installed in the door of room No. 301. The housing 20 is preferably molded or cast as an integral shell of sturdy material, such as aluminum, brass or engineering plastic, which will withstand weathering and also resist attempts to break through the lock from the outside. All of the necessary items for operation of this system, except the data card carried by the room occupant, are contained within housing 20 including the necessary battery power supply, thus rendering each unit fully independent and self-contained. The housing has a protruding section 22 with a slot 24 for receiving data card 120 to be inserted from the outside. The handle 26 on the outside of the door does not operate the lock but is provided merely for convenient pushing or pulling on the door once the lock is open. Thus, there is no mechanical linkage into the lock from outside the door and the door may be opened from outside only by inserting a correct code combination into the lock, such as an appropriating coded data combination card, pausing momentarily while the necessary electronic functions are performed and the bolt is retracted, and then pushing on the handle 26.

Figure 2:
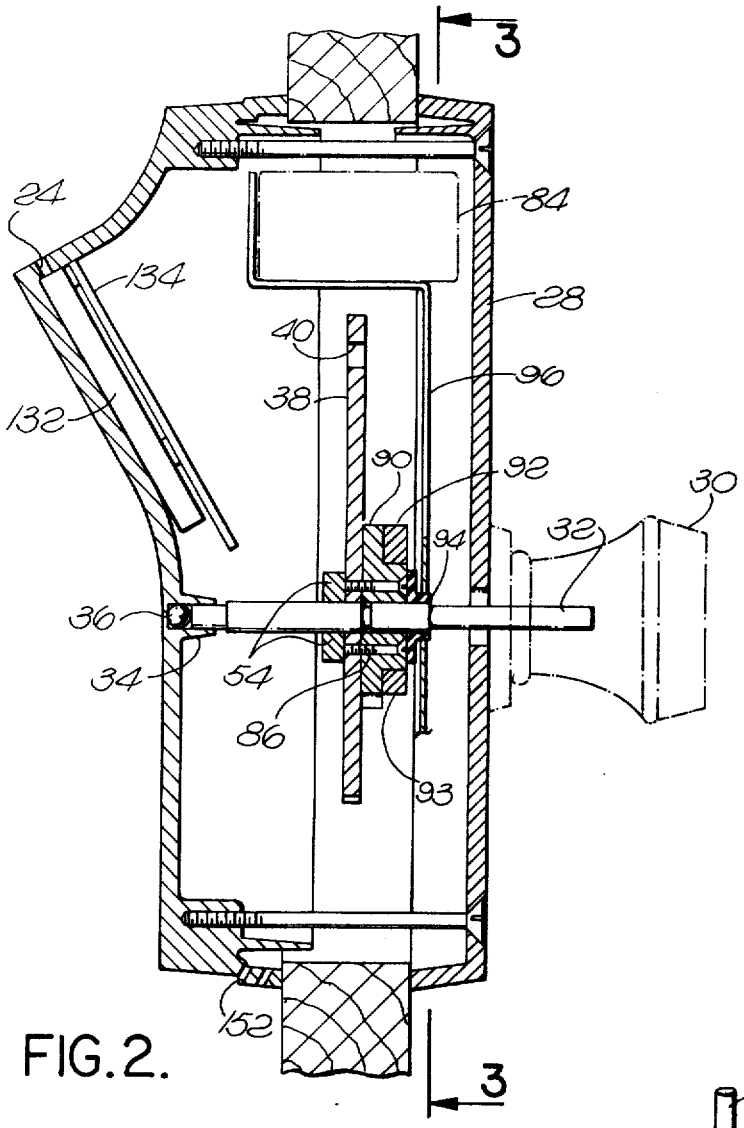
FIG. 2 is a cross-sectional elevation view of a preferred embodiment of the invention taken along the line 2—2 of FIG. 1.

The housing and bolt dimensions may be altered to fit practically any existing door and jamb system. As is shown in FIG. 2, the housing back plate 28 is not only easily removable to provide access to the housing interior in order to change batteries 84 or for other maintenance, but allows the unit to accommodate various door thicknesses by merely screwing the back plate towards or away from the remainder of the housing 20. Installation only requires cutting an appropriate size notch inwardly from the side or edge of the door, sliding the unit into the notch as shown in FIG. 2, and securing the housing to the door by screwing the back plate 28 to the rest of the housing. Additional fastening means (not shown) may be employed to secure the housing to the door from the inside or edge of the door. The entire system can be assembled or repaired at a remote location and tested before shipment so that installation is accomplished in a matter of minutes. Since each unit is independent and contains its own energy source, connection to a high energy source or to a central control system is not required.

Figure 3:
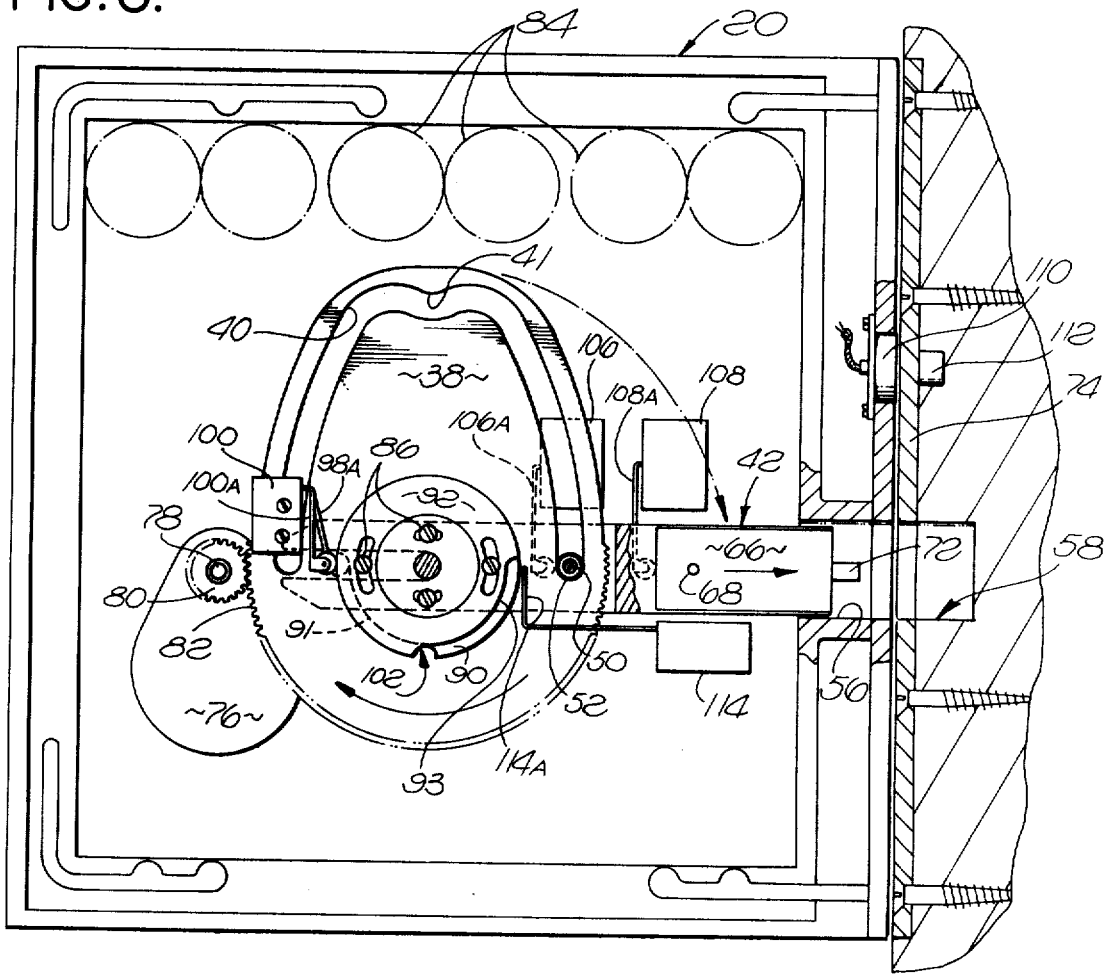
FIG. 3 is a cross-sectional elevation view taken along the line 3—3 of FIG. 2.

Bolt 42 is shown in its fully retracted position in FIGS. 2 and 3. The door lock may be operated from inside by manually rotating the door handle 30 and connecting shaft 32 which extends through the housing and rides in sleeve 34 against bearing 36. Shaft 32 is attached, by welding or the like, to bolt cam plate 38 so that rotation of the handle rotates the cam plate about the longitudinal axis of shaft 32.

Figure 4:
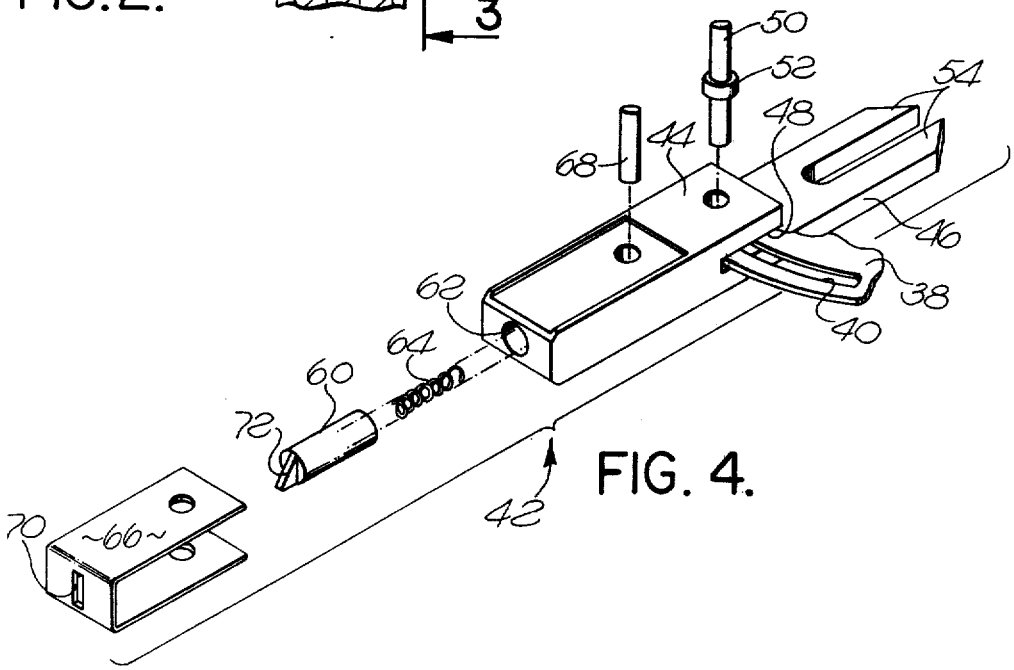
FIG. 4 is a perspective exploded view of the bolt structure of FIGS. 1 and 2.

Bolt 42 (FIG. 4), preferably constructed of a block of rigid, durable material, such as stainless steel or the like, has an upper short leg 44 and a notched lower leg 46 forming two sides of cam receiving slot 48. The periphery of cam 38 rides in slot 48 so that guide pin 50 extending through the two legs 44 and 46 and through the non-linear cam plate slot 40 (FIGS. 3 and 4) translates the rotation of cam plate 38 into longitudinal reciprocation of bolt 42. A low friction bearing 52, such as a nylon sleeve, surrounds guide pin 50 in slot 40 to reduce the friction as between the pin and the cam 38. The two guides 54 at the end of slotted bolt leg 46 ride on opposite sides of shaft 32 while the opposite end of the bolt rides within slot 56 extending through the wall of housing 20 to maintain the bolt longitudinally aligned as it reciprocates.

Bolt 42 has a spring-loaded catch to temporarily hold the door shut upon catching in bolt receptacle 58 when the door is first closed to allow the bolt an opportunity to fully extend. This catch mechanism includes a hollow cylinder 60 which rides within cylindrical aperture 62 in the end of the bolt. Spring 64 within the cylinder 60 tends to push the catch outwardly but against restraining U-shaped nylon strip 66 secured over the end of the bolt pin 68, a rectangular cutout 70 in the connecting leg allows a projecting wedge-shaped lug 72 to protrude about three-eighths inch from the end of the bolt through the nylon strip. The strip 66 is positioned in the recessed opposed faces of the bolt 42 so that its outer surfaces are slightly raised above the bolt to provide low friction bearing surfaces between the bolt and the sides of the slot 56 and bolt recess 58.

When the bolt 42 is fully extended, the cam 38 will be rotated clockwise 90° from its position shown in FIG. 3 and pin 50 will be positioned at detent 41 one-half way between the two ends of cam slot 40 which extends slightly more than 180° around the periphery of the cam. Upon further rotation of the cam in either direction, pin 50 travels along cam slot 40 and since the non-linear slot is closer at its ends to the cam center of rotation, the bolt 42 is withdrawn into the housing 20. The non-linear construction of slot 40 also serves to minimize starting torque on the motor when a card is used to retract the bolt and detent 41 eliminates the possibility of cam rotation by inward pressure against bolt 42.

After the door is open, the lock mechanism will extend the bolt until only the lug 72 protrudes beyond the edge of the door, as will be explained hereinafter. As the door closes, the angled surface of lug 72 rides against the striker plate 74 attached to the jamb and the cylinder 60 is pushed back into the bolt against spring 62. As soon as the lug fully engages the bolt receptacle 58, the spring pushes the lug into the bolt receptacle thus stopping the door from bouncing back or being pulled away from the jamb to provide the bolt 42 an opportunity to fully extend about another one inch into receptacle 58, as will be explained hereinafter.

Slot 40 extends slightly more than 180° around the periphery of the cam plate 38 so that the bolt may be retracted by rotating handle 30 in either direction. The motor 76 has a low inertia and is internally clutched to allow the cam 38 to be turned by hand against the drive of the motor without damaging the motor. Since there is also a straight spur gear drive from the motor 76 to cam plate 38, there is no impediment to opening the door from the inside whether the motor is on or off.

To open the door from the outside, a data combination card 120 is inserted into slot 24 to actuate the electronic mechanism, explained hereinafter, which switches on electric motor 76 (FIG. 3) if the card contains the appropriate combination code. Pinion gear 80, mounted on motor drive shaft 78, meshes with the semicircular gear 82 extending more than 180° around the periphery of cam 38 to drive bolt 42. The power for motor 76, as well as for the rest of the circuitry described hereinafter, is provided by batteries 84 arranged conveniently within the housing 20, such as along one wall as is shown in FIGS. 2 and 3. Batteries 84 may be conveniently changed by merely unscrewing back plate 28 and pulling out the batteries.

Two switch cams 90 and 92 are secured to cam plate 38 with bolts 86 to rotate in conjunction with the cam plate about the same axis of rotation. Each cam 90 and 92 has a partly recessed periphery 91 and 93 respectively which overlap at 102. A low friction bushing 94, such as a nylon sleeve, surrounds shaft 32 between switch cam 92 and mounting plate 96 to maintain the shaft in alignment and to apply sufficient pressure to keep the opposite end of the shaft riding snugly against bearing 36.

Two microswitches 98 and 100 are positioned so that their roller bearing switch arms 98A and 100A ride along the periphery of the cams 90 and 92 respectively (FIG. 3). The microswitch roller bearings are aligned along a horizontal axis so that they are both positioned at 102 in their respective recesses when the bolt 42 is fully extended.

As may be seen in FIG. 3, microswitch 98A rests at one end of cam recess 91 when the cam 38 is fully rotated in the counterclockwise direction. Microswitch arm 98A continues to ride in recess 91 as cam 38 begins to rotate clockwise until bolt 42 is fully extended and cam 38 centered so that microswitch arm 100A, which has been riding along the raised periphery of cam 92, drops into the recess 93 at point 102. When both switch arms are in their respective recesses at 102, the bolt is fully extended. As cam 38 continues to rotate in the clockwise direction, bolt 42 again retracts and switch arms 98A will ride up out of recess 91 while switch arm 100A continues to ride in recess 93. In this manner, microswitches 98 and 100 sense the direction in which cam 38 has been turned as well as the fully extended position of the bolt.

Two other microswitches 106 and 108 are actuated by the raised extension of guide pin 50 contacting the respective arms 106A and 108A as it travels with reciprocating bolt 42. When bolt 42 is fully retracted, as shown in FIG. 3, guide pin 50 engages switch arm 106A. Microswitch arm 108A is contacted by pin 50 to switch off motor 76 as the bolt extends to the point where only catch lug 72 extends beyond slot 56 so that the door can be closed against the spring action of the catch without interference from the rest of the bolt. When the door is closed and the catch engaged, magnetic switch 110 inside housing 20 detects the presence of the magnet 112 behind striker plate 74 and switches on motor 76 to continue the bolt extension into receptacle 58.

In operation, when the appropriate card 120 is inserted into slot 24, motor 76 is switched on to withdraw the bolt 42 from receptacle 58. Guide pin 50 contacts switch arm 106A when the bolt is fully withdrawn to switch the motor off. The door may then be pushed open and the card withdrawn. Magnetic switch 110 detects the absence of magnet 112 when the door is open and switches on motor 76 to extend the bolt until guide pin 50 contacts switch arm 108A. This switches off the motor so that only the catch lug 72 extends beyond the edge of the door to engage the striker plate and the bolt receptacle when the door is closed. After the door is closed, lug 72 prevents the door from being pulled or bounced open and magnetic switch 110, detecting the presence of the magnet 112, switches on motor 76 to continue the bolt extension until both switch arms 98A and 100A are riding in their respective recesses at position 102, whereupon the motor 76 is switched off. The door can be opened again only by either inserting an appropriate data combination card or by rotating handle 30 from inside the door.

As previously explained, rotating handle 30 in either direction withdraws the bolt 42 and overrides the inertia and/or drive of motor 76 so that the door may be opened from inside. The relative position of microswitch arms 98A and 100A indicates the direction in which cam 38 has been turned and magnetic switch 110, detecting the absence of magnet 112, will switch on the motor 76 to begin extending the bolt 42. The bolt will continue to extend until the guide pin 50 contacts switch arm 108A and the procedure will continue as previously described.

A lock-out slide switch 114 is positioned to be operated from inside the door to disconnect electrical power from the card reader 132, thereby disabling the lock to prevent entry from outside through the use of any card. When switch 114 is actuated, its switch arm 114A is moved against switch arm 106A so that retraction of bolt 42 by rotating handle 30 causes pin 50 to push against switch arm 114A, as well as switch arm 106a, thereby resetting switch 114 to reconnect the electrical power so that the room occupant cannot lock himself out with switch 114. It will be apparent from the foregoing that a dead bolt lock is provided whenever the bolt is engaged in receptacle 58 and that very little energy is required to extend and retract the bolt since it is not acting against the force of any springs or the like. In fact, a 6 volt, 40 milliamp motor has been found to operate satisfactorily in the described embodiment of the invention.

THE DATA COMBINATION CARD

The data combination card employed in this invention may take many forms, such as raised ferrous or nonferrous metal spots on a nonmetallic substrate. However, in the preferred form of this invention, the card 120 shown in FIG. 5 is originally an elongated rectangular strip, divided into three equal parts to be folded together from one end so that the end portion first folded finally becomes the central layer of the card. The card has three layers laminated together, the two outer layers 122 and 124 and the central layer 126 being composed of a nonmetallic, electrically insulating material, such as plastic, cardboard or the like. The central layer 126 also contains a predetermined matrix pattern of holes adapted to receive nonferrous metal plugs. However, in this embodiment of the invention, the nonferrous metal spots 128 are formed by a sheet of aluminum foil secured to the reverse side of central layer 126. Before the three layers are laminated together, some of the metal spots are punched out or removed from across the holes to create a binary code or combination of holes and metal spots on the central layer, which combination is sensed to determine the operation of the door lock. The three layers are then laminated together so that the code is invisible and attempts to remove the outer layers will result in the destruction of the card and its code pattern.

Each card 120 has an elongated notch 130 cut in one side to match a tab in the card reader so that the card can be inserted into the card reader in only the one position which correctly positions the card's pattern of holes and spots in the reader.

A device (not shown) for encoding the data combination cards 120 may include anything from a sophisticated computer which stores masses of information to a simple manual paper and pencil procedure. One of the determining factors is the amount of information contained in the cards 120 which must be stored, either in an electronic memory or on paper, so that either a duplicate card or the next card in series can be encoded at a later time.

In this embodiment of the invention, the combination code of each card is divided into four parts which are used to designate the type of card, the hotel and room number, an old code, and a new code. The function of each of these various codes will be described hereinafter in connection with FIGS. 11 and 12.

If a machine is employed to encode the cards, it will have a logic portion, an active memory, a random number generator, thumb wheels or other means for entering information, and a device for removing or punching metal spots from the cards. When a new card is to be encoded, the central layer 126 is inserted into the machine and the type of card, such as a guest card, and the room number are manually set into the machine by rotating appropriate thumb wheels. The encoding machine will already have stored in its memory the hotel code and the new and old codes for the last card of that type issued for that particular room. The electronic encoding machine will encode as the card's new code a random number from the random number generator and the card's old code will be the previous card's new code. When this information is provided, the encoding machine will actuate the appropriate punches to remove selected metal spots 128 from the middle layer 126 and thereby encode the card with this information in binary form. The card is then withdrawn from the encoding machine and laminated together so that the middle layer 126 is concealed between the two outer layers 122 and 124.

If a duplicate card is desired, the same procedure is followed except that both the old and new codes of the previous card are recalled from memory and encoded in the old and new code positions respectively of the duplicate card.

As previously mentioned, this procedure could be performed manually by employing a pencil and paper to record the necessary information and to remove the appropriate metal spots 128. While this would be extremely time-consuming and awkward for use in a hotel, it might be very well suited to home use.

THE CARD READER

The card reader 132 (FIGS. 6 and 7) is secured in the unit housing 20 beneath the slot 24 to receive cards 120, as shown in FIG. 2, a printed circuitboard 134, mounted on the opposite side of the card reader, provides electrical connection between the sensors positioned within the card reader to the remaining circuitry described hereinafter.

The card reader is composed of an electrically insulating, nonmetallic material, such as plastic or the like, and has a relatively thin planar wall 136 secured adjacent to the housing 20. The opposed thicker wall 138 contains a predetermined pattern of cylindrical sensor receptacles 140 which corresponds in size and location to the pattern of metal spots and holes in the card 120. Receptacles 140 terminate short of the recess 142 so that a thin layer of plastic separates the sensor receptacles from a card positioned in the recess to protect the sensors 154. A tab 144 extending into the recess 142 permits a data card to be inserted only when its mating notch 130 is correctly positioned so that the card holes and metal spots are aligned with adjacent cylindrical receptacles.

Microswitch 146 in the bottom of card reader 132 is actuated by any correctly inserted card to connect the batteries to the card reader sensors.

A female printed circuitboard connector 148 at the bottom open end of recess 142 receives an emergency override device or security pass unit which will be explained hereinafter. Drain hole 150 through the bottom of the card reader and a similar drain hole 152 in the bottom of the housing 20 (FIG. 2) provide for moisture drainage.

THE SENSORS

In the preferred embodiment of this invention, the sensors 154 shown in FIG. 8 are small cylindrical cup-shaped blocks of ferrous metal, such as an iron compounds pot core, each having two coils 160 and 162 would between a raised rim 156 and a raised center post 158. A sensor is secured in each sensor receptacle 140, as shown in FIG. 7, with the open end of the sensor cup adjacent the closed end of the receptacle.

The leads from the coils are wired to printed circuitboard 134 where each sensor is connected to a separate sensor circuit 176 (FIG. 9) to produce signals representing a logical binary 1 or 0 in response to the absence or presence respectively of a metal spot 128 adjacent the sensor. The coils 160 and 162 act as the primary and secondary coils respectively of an iron core transformer. In this embodiment of the invention, the coils are chosen so that the turns ratio is 1 to 1 and the oscillator 164 provides intermittent bursts of high frequency constant amplitude signal, about 3 volts, through the tuned circuit of capacitor 166 and coil 160. Capacitor 168 has the same value as capacitor 166, about 0.047 microfarads, so that the two circuits are tuned to about the same frequency when there is no metal spot 128 present.

Diode 170 rectifies the induced signal to produce a direct current output across capacitor 172 and resistor 174, about 1 megohm, limits the output signal across capacitor 172, about 0.01 microfarads.

As is well known, when the oscillator 164 provides alternating current through coil 160, which in turn induces an alternating current in coil 162, an alternating magnetic field is set up between the outer ring 156 and center post 158 of the sensor. If nothing impedes this magnetic field, the signal across capacitor 172 will be relatively large, such as about ten volts. However, when one of the nonferrous metal spots 128 is positioned adjacent to and across the top of the sensor, opposing magnetic fields are set up in the spot which change the mutual inductance between the coils 160 and 162 and block out a large amount of inductive transfer between the two coils, thus producing a much smaller output, such as about 2 volts. Thus, the binary logical 1 may be equated with the 10 volt output while the binary logical 0 may be equated with the 2 volt output.

It will be apparent that by selectively removing metal spots 128, a large amount of coded information may be stored in binary form on each data card. This information is uniquely employed in this invention not only to open the door lock but also to conveniently change the previously set lock combination code without using any means other than a new card provided to the new room occupant or the like.

THE CENTRAL PROCESSING UNIT

Figure 10:
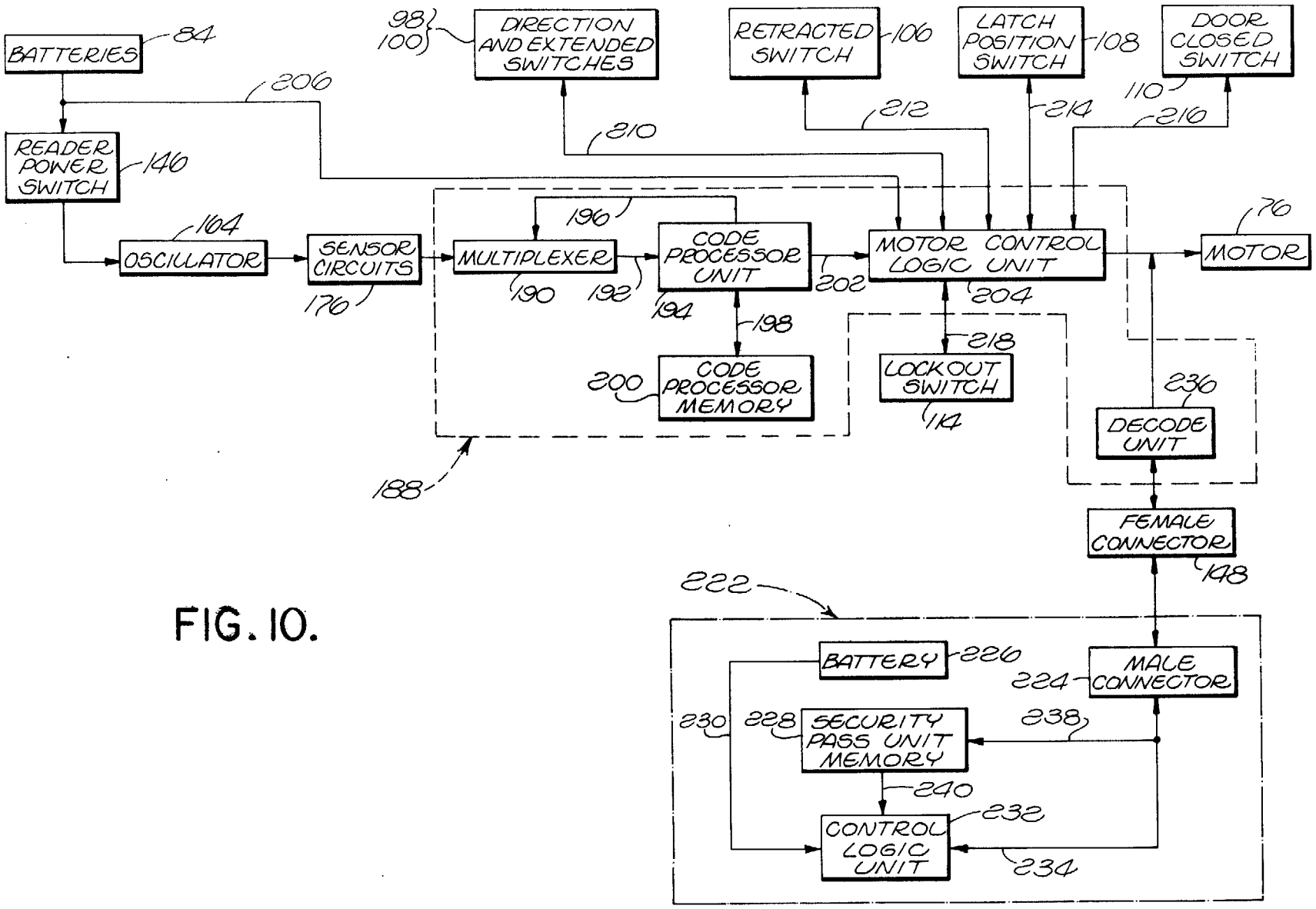
FIG. 10 is a schematic block diagram of the electrical elements of the preferred embodiment of this invention.

The central processing unit 188 shown in FIG. 10 receives electrical signals from the sensor circuits and the various switches previously described to control the operation of the bolt 42 through motor 76, as will be described hereinafter in connection with FIGS. 11 and 12. Various physical apparatus well known to those skilled in the art may be employed as specific elements in the block diagram of FIG. 10, and therefore only the function and operation of these elements will be described in detail. It should be noted that all of the elements shown in FIG. 10, except the security pass unit 222, are conveniently contained on the ciruitboard 134 or elsewhere within the unitary housing structure 20.

The correct insertion of any data combination card 120 into the card reader 132 actuates power switch 146 which connects the batteries 84 to oscillator 164. Multiplexer 190 receives the various sensor circuit output signals, stores them in the proper format, and signals code processor 194 that information is ready to be processed. Code processor 194 then interrogates each multiplexer switch over line 196 and receives the binary 0 or 1 signal over line 192 for each sensor. The code processor compares the sensor circuit outputs with the corresponding code information stored in code processor memory 200 and received over line 198. Memory 200 includes both fixed and active portions, as will be explained hereinafter. If comparison between the sensor circuit signals from the multiplexer and the memory information shows that a card with the appropriate code has been inserted into the card reader, the code processor provides a signal over connection 202 to the motor control logic 204 which in turn drives motor 76 in the appropriate direction while taking into consideration the condition of the various switches. Motor control logic 204 is also directly connected to batteries 84 over line 206 so that the motor may be driven in response to signals from the switches 98, 100, 106, 108, 110 and 114 over their respective connections 210, 212, 214, 216 and 218, as described hereinafter, even when a data card has not been inserted into the card reader to actuate power switch 146.

Lock-out switch 114, previously described, provides the person inside the door with security in all except emergency situations by disconnecting the batteries 84 from motor 76 through motor control logic 204. However, there must be at least one means of access from the outside even where the lock-out switch is engaged in case the occupant needs to be evacuated, as in a fire or the like. Therefore, a security pass unit 222, shown schematically in FIG. 10, employs a male connector 224 which may be inserted through card reader 132 to plug into female connector 148 at the bottom of the card reader. The security pass unit has its own battery power supply 226 to operate the motor 76 even when the batteries 84 are disconnected by lock-out switch 114.

Security pass unit 222 contains its own read-only memory 228 which has stored the information necessary to operate each decode unit 236 of every room lock. Battery 226 supplies power over connection 230 to control logic unit 232 which in turn interrogates the individual room decode unit 236 over line 234 by sending clock signals to the decode unit. The decode unit responds by sending a unique serial code pattern to address the security pass unit read-only memory 228 over line 238. Memory 228 in response supplies signals from its addressed portions to logic unit 232 over line 240 where these signals are converted to serial form and transmitted to the decode unit over line 234. When the comparator of decode unit 232 is satisfied, the decode unit connects battery 226 through the logic unit to motor 76 to retract the bolt so the door can be opened from outside. The bolt retraction also resets lock-out switch 114 if it has been previously engaged.

The decode unit of each room always addresses a unique portion of memory 228 which is different from the portion of memory addressed by the decode unit of any other room. Read-only memory 228 has been programmed to provide a unique response upon receiving the code pattern for that particular room, but this response has been randomly selected and bears no mathematical relationship to the decode unit signal to memory.

Since each decode unit will recognize only one particular combination of signals, and since this response is different for each door and bears no mathematical relation to the interrogating code pattern from the decode unit, it is difficult to break the code for any door and should one code be broken, no other room will be compromised as a result.

Figure 11:
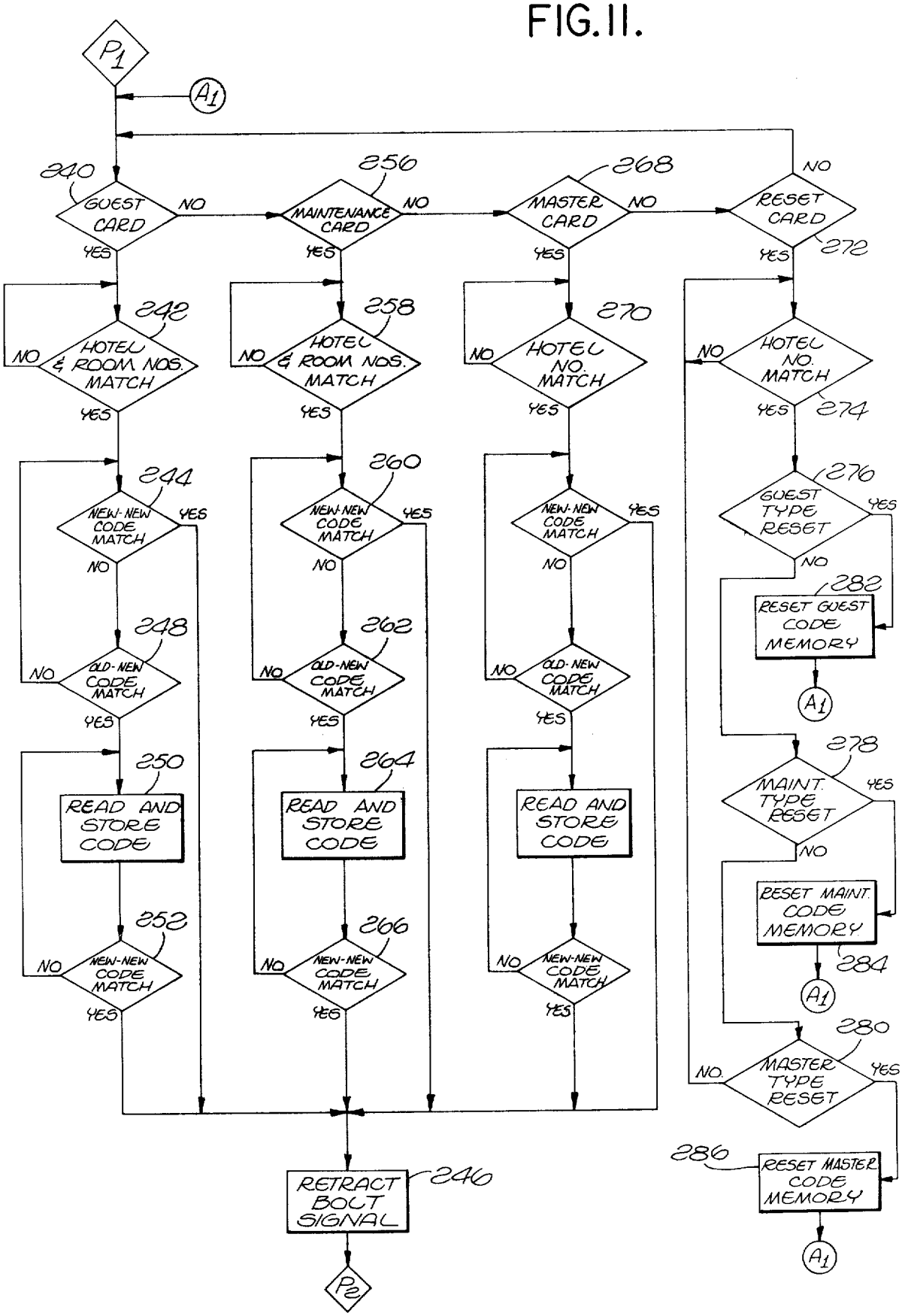
FIG. 11 is a flow chart of the logical operations of the code processor unit and associated memory of FIG. 10; and, FIG. 12 is a flow chart of the logical operations of the motor control logic unit and associated motor of FIG. 10.

FIG. 11 is a flow diagram or chart showing the operation of the code processor 194 and memory 200. FIG. 12 is a flow diagram showing the operation of the motor control logic unit 204 and associated switches. The beginning point P1 in FIG. 11 represents the signals from multiplexer 190 resulting from the output of the sensor circuits. The end point P2 in FIG. 11 represents the signal of the code processor to motor control logic unit 204. This same point P2 is one of the beginning points in FIG. 12. According to the convention adopted in both FIGS. 11 and 12, the diamonds represent information to be supplied or questions asked regarding various logic conditions and the information or answers determine the path to be taken to the next step. Thus, the word "yes" or "no" is written adjacent to the arrows extending from each diamond to indicate the logic condition or how the question contained within the diamond has been answered and the resulting path to be followed. The rectangles in FIGS. 11 and 12 contain instructions to the various logic or memory elements involved and the instruction is presumed to be carried out at that position in the flow diagram. The arrows on the connecting lines indicate the direction of flow of the steps through the diagram.

Referring now to FIG. 11, the sensor circuits are interrogated through point P1 to first determine the type of data combination card inserted in the card reader. Depending on how the system is used, there may be one or more types of cards employed. In the embodiment described herein where the system is employed in a hotel, there are guest, maintenance, master and reset type data combination cards. It will be apparent, however, that for home use, for example, the maintenance and master cards may be eliminated and thus the system simplified to that extent.

Since the guest card will be used most frequently, that card type is first determined at 240. If the portion of the sensor circuits assigned that function indicate a guest card, the answer is yes and the sensor circuits are then interrogated to determine the hotel and room number coded on the card. If the hotel and room number code determined at 242 do not match the code fixed in that lock's memory 200, the door will not unlock and the logic sequence will repeat until the condition is satisfied by the correct hotel and room number code being supplied. If the hotel and room number code is correct, the new code part of the card will be compared at 244 with the new code part of the active portion of memory 200. If the new codes match, a signal is generated at 246 to instruct the motor control logic unit to retract the bolt 42. Since the new code of the data card is a randomly selected number, it will match the new code of the lock's memory only where that card is the same card as was last used in the lock as, for example, where a guest is reentering his assigned room.

Where the new code does not match, as when a new guest is using his card for the first time, the card's old code is compared at 248 with the lock's new code. If the old code does not match the lock's new code, the logic sequence will recycle the logic to 244 without unlocking the door and repeat until a card is provided with either a new or old code which matches the new code of memory 200. Where the old code does match, the new and old codes of the card are read into the active portion of memory 200 at 250 to change both the new and old parts of memory respectively so that the card's new code is now the memory's new code and the card's old code is now the memory's old code. The new code parts of the card and memory are then again compared at 252 and if they match, as they should since the new code active memory has just been changed, a signal is generated at 246 to retract the bolt. If for some reason the card and memory new code parts still do not match, the logic repeats back to 250 to read and store the card's new and old codes in memory as previously described.

The above-described method of changing the new and old code parts of the active portion of memory 200 automatically alters the lock combination code without either connection to a remote central control system or the necessity of hotel employees manually changing the lock combinations every day. Instead, each new hotel guest automatically changes the old and new code in the lock memory of his assigned room upon inserting his new card the first time, thus rendering inoperative all previously issued guest cards.

Returning to FIG. 11, if the data card is determined at 240 not be a guest type card, the multiplexer is interrogated at 256 to see if the card is the type issued to maintenance personnel, and if it is, the hotel and room number code is compared at 258 to determine whether that particular card is authorized to enter that room. The maintenance card room number code may include a series of rooms, for example, all rooms on one floor of a hotel, which an individual is authorized to enter and service.

If the hotel and room number codes do not match, the logic will repeat and the door will remain bolted. If, however, a match is obtained at 258, the same sequence of steps will be followed as for the guest card where the new codes are compared at 260 and if a match is obtained, a signal is generated at 246 to retract the bolt. This will be a common occurrence since maintenance personnel are likely to be assigned to the same rooms for an extended period of time. Where room assignments are changed and new maintenance cards issued, the new codes will not match and the card's old code is compared with the lock's new code at 262 and when found to match, the card's new and old codes are read and stored into the new and old code parts respectively of the lock's active memory at 264 so that the new codes will then match at 266 to generate a retract bolt signal at 246. This same procedure automatically locks out all previously issued maintenance cards.

As in most lock systems, provision is made for a master key or data combination card which will unlock any door in the hotel from the outside except when the lock-out switch 114 has been engaged. Thus, if the card inserted in the card reader is neither a guest nor a maintenance type, but is determined at 268 to be a master type, only the proper hotel code needs to be matched at 270 since the master card is to open all room doors. The flow chart operation sequence for the remainder of the master card operation is the same as for the guest and maintenance card operations previously described, and therefore the remainder of the master card operation shown schematically in FIG. 11 will now be specifically described.

It will be apparent that guest, maintenance and master type cards each address a different part of the active portion of memory 200 since each card type must be able to open the lock and change the lock combination for that card type without changing the lock code combination for any of the other card types.

A reset card is provided in the event that an authorized card will not unlock a door, such as where a first guest or other type card is issued but never inserted in the card reader. Neither the old nor new code of the next second card issued will match either of the lock's new or old codes since the lock's codes were never updated by the first card. Since the second card will not unlock the door, a reset card is encoded with the reset type code, the hotel and room number codes, the type of the second card, and randomly selected new and old codes. The reset type card is determined at 272 and if the card is not a reset type, the logic repeats until an authorized card type is inserted into the card reader. After a correct reset type code is recognized at 272, the hotel number code is compared at 274, and if it matches, the type of reset desired (guest, maintenance or master) is determined at 276, 278 and 280 respectively. If none of these compare, the logic will repeat without changing any memory. Where a match is obtained, depending on the card type memory to be changed, the reset card's new and old codes are read and stored into the appropriate parts of the active portion of memory 200 as the new and old guest, maintenance or master codes at 282, 284 and 286 respectively. The door is not opened by the reset card, however, as indicated by point A1 which repeats to beginning point P1 following each of the code changes at 282, 284 and 286. Instead, a new card of the appropriate type is encoded with the new and old codes just stored in memory 200 and this latter card unlocks the door. Alternatively, the new guest, maintenance or master card may be encoded with the lock's new code as the card's old code and with a randomly generated new code.

Figure 12:
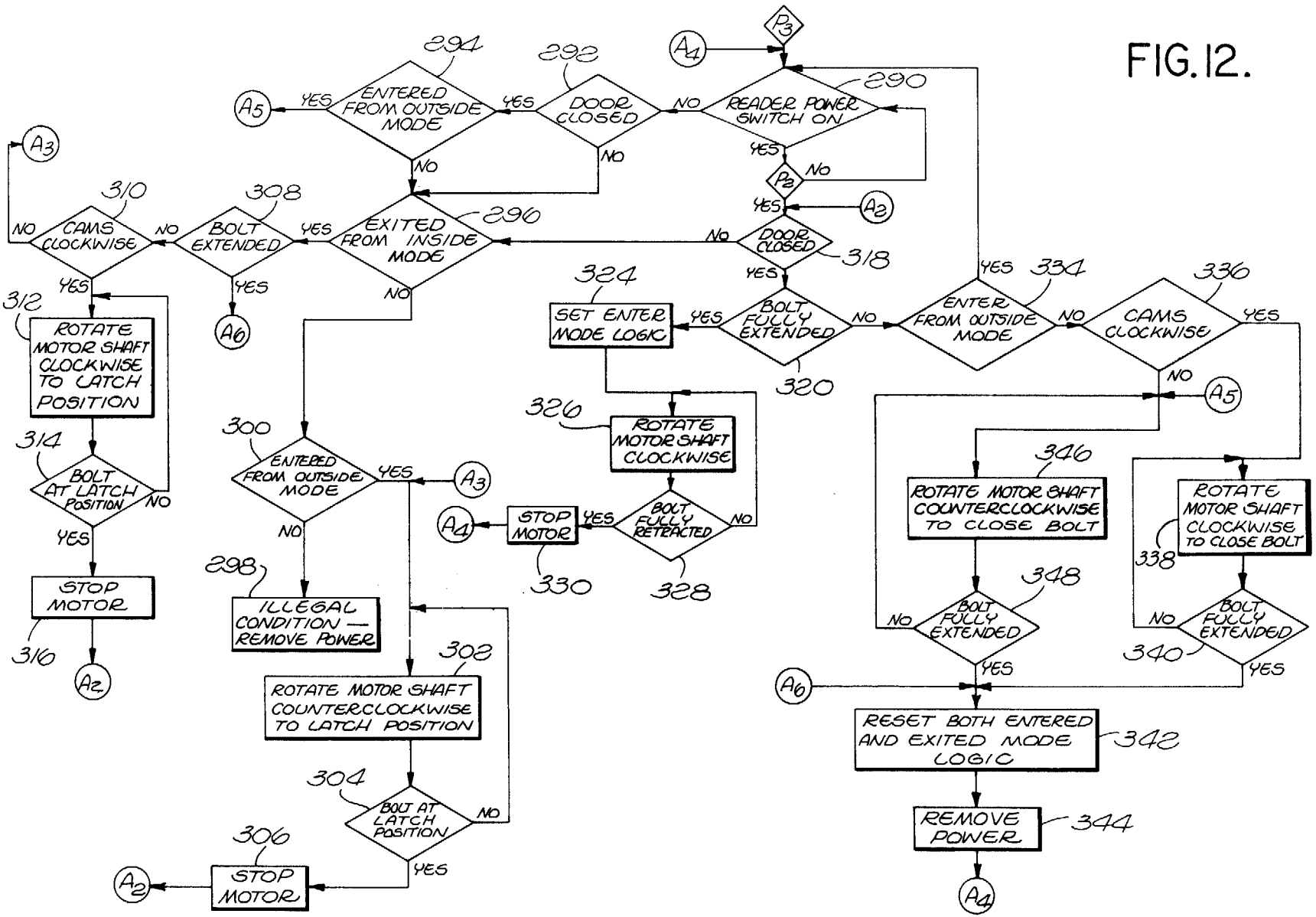

FIG. 12 shows the operation of the motor control logic unit 204. Connection 206 supplies power from batteries 84 so that logic unit 204 can operate motor 76 without a card in the reader. This situation, indicated at entry point P3, arises when the lock is hand-operated from the inside and it becomes necessary to extend the bolt. Entry point P3 leads to inquiry 290 as to whether power switch 146 is on, which will be the case if any card is correctly inserted in the card reader. Point P2 in FIG. 12 indicates a signal received from the code processor to retract the bolt, as previously explained in connection with FIG. 11, resulting from insertion of an appropriately coded data card. Thus, to continue past point P2, an authorized data card must be correctly inserted into the card reader.

If the reader power switch is not on, magnetic switch 110 detects whether the door is closed at 292. If the door is closed, it is determined at 294 whether the door was last attempted to be opened from the outside and if so, point A5 leads to a bolt extended condition as will be explained hereinafter. If the last door opening was not attempted from the outside, it is determined at 296 whether the last door opening was attempted from the inside, and if not, this leads to an illegal or failure to satisfy condition and the power is removed to stop the logic sequence at 298. If the last door opening as determined at 296 was attempted from the inside, the bolt is extended, as will be explained hereinafter.

Returning now to 292, if the door is not closed, it is again determined at 296 whether the last attempted door opening was from the inside. If it was not and is determined at 300 that the last door opening was also not from the outside, an illegal condition again ensues and the power is removed at 298. If the last attempted opening was, however, from the outside as determined at 300, the motor shaft is rotated counterclockwise at 302 to extend the bolt to its latch position, that is, to extend the bolt 42 until only the lug 72 extends beyond the door. The motor shaft rotation continues until the latch is determined by switch 108 to be extended at 304 and then the motor is stopped at 306 and the logic sequence resets to point A2 to await closure of the door.

Whether or not the reader power switch is on, if the door is not closed the flow chart leads to point 296. If the last attempted door opening was from the inside, the cam direction switches 98 and 100 sense whether the bolt is fully extended at 308 and if it is, point A6 leads to a removal of power at 344, as will be explained hereinafter. If the bolt is not fully extended, it is detected at 310 whether the cams were turned clockwise or counterclockwise to retract the bolt. If the cams were rotated counterclockwise, the flow chart leads through point A3 to the instruction 302 to rotate the motor shaft counterclockwise to close the bolt to its latch position as previously explained. If, however, the cams were rotated clockwise, the motor shaft is instructed at 312 to rotate in the clockwise direction to extend the bolt to its latch position at 314. The motor will continue to operate until the bolt is extended to its latch position and will then stop at 316 and the logic sequence will recycle through point A2 to wait for the door to close at 318.

If the power switch is on at 290 and if a signal to retract the bolt is received at point P2, it will be determined at 318 whether the door is close. If no retract bolt signal is received a point P2, the logic sequence will proceed no further since an unauthorized card is in the card reader. If the door is not closed at 318, the logic sequence proceeds to 296 to determine whether the last attempted door opening was from the inside, as previously explained. If, however, the door is closed, as where the occupant is using his card to try to enter the room from the outside, direction switches 98 and 100 indicate at 320 whether the bolt is fully extended. If the bolt is fully extended, the motor control logic is set at 324 to indicate, until changed, that the attempt to enter the room is now from the outside. The motor shaft in this embodiment of the invention is always rotated clockwise at 326 to retract the bolt upon insertion of a correctly coded card until the bolt is indicated to be fully retracted at 328, at which time the motor is stopped at 330 and the logic sequence repeats through point A4 to the beginning until the reader power switch is turned off by removal of the data card.

If the bolt is not fully extended at 320, an inquiry at 334 determines whether a person with a card is still waiting to enter from the outside. If he is, the logic sequence will repeat leaving the bolt open until the card is withdrawn. If entrance was not last attempted from the outside, as determined at 334, the direction of cam rotation is detected at 336 and if the cams are rotated clockwise, the motor shaft is rotated clockwise at at 338 to extend the bolt. The logic sequence repeats through 340 until the bolt is fully extended, at which time both the entered and exited mode logic is reset to a zero condition at 342, the power is removed from the motor at 344, and the logic sequence recycles through point A4 to determine whether the power switch is still on. If the cams have, however, been rotated counterclockwise, the motor shaft is rotated counterclockwise at 346 to extend the bolt. When the bolt is determined to have been fully extended at 348, the entered and exited mode logic will again be reset to zero at 342, the power removed at 344, and the logic sequence will repeat as previously described.

While the invention has been illustrated and described in terms of a particular embodiment, it will be understood that various modifications and changes may be made without departing from the actual scope of the invention.

What is claimed is:

1. An independently operable electronic lock and system having an alterable combination, said lock being operable in response to insertion of a correct combination code, comprising:

a lock housing adapted to be secured in a door;

securing means attached to said housing;

alterable memory means within said housing storing combination information for operating said lock;

means within said housing for receiving and detecting a first stationary combination code inserted into the lock, comparing said inserted first combination code with said stored combination information, and generating a drive signal when a comparison is favorable;

said receiving and detecting means comprising a plurality of sensor coils connected to receive the output of an oscillator, each coil having a ferrous metal core and being connected to produce a first signal across said coil in the absence of a code entry and a second signal across said coil in the presence of a code entry and a tuned circuit connected to produce a first output in response to the first signal across the respective coil and a second output in response to the second signal across the respective coil;

said inserted code entries comprising at least one electrically conductive area positioned adjacent to and within the magnetic field of at least one of said sensor coils to cause said second signal to be produced across said at least one coil, said first and second output signals providing a second combination code corresponding to said first combination code;

drive means within said housing adapted to operate said securing means in response to said drive signal;

means within said housing for changing said stored combination information to said inserted combination when a comparison is favorable; and, an energy source connected to supply the power requirements of said lock and system.

2. An electronic lock and system as defined in claim 1 wherein:

said receiving and detecting means includes a card reader mounting said sensor coils and a protrusion extending inwardly into the card reader to prohibit access to the portion of the card reader in the area of said protrusion; and further comprising:

a combination card adapted to be received by said card reader and having at least one plane, said card having a notch formed in at least one side to receive said card reader protrusion, said electrically conductive area being positioned on said plane to lie opposite a corresponding sensor coil when said card is positioned in said card reader so that said notch receives said protrusion.

*3. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a tuned circuit connected to produce a first output in response to the first signal across the respective coil and a second output in response to the second signal across the respective coil;*

*said received combination comprising being represented in a form at least one magnetically reactive received combination area positioned adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*4. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a tuned circuit connected to produce a first output in response to the first signal across the respective coil and a second output in response to the second signal across the respective coil;*

*said received combination being represented in a form comprising at least one magnetically reactive received combination area adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*5. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a tuned circuit connected to produce a first output in response to the first signal across the respective coil and a second output in response to the second signal across the respective coil;*

*said received combination being represented in a form comprising at least one magnetically reactive area at least temporarily positioned adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*6. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a tuned circuit connected to produce a first output in response to the first signal across the respective coil and a second output in response to the second signal across the respective coil;*

*said received combination being represented in a form comprising at least one magnetically reactive received combination area for causing, by its presence adjacent to and within the magnetic field of at least one of said sensor coils, said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*7. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising at least one sensor coil connected to receive the output of an oscillator, said coil having a ferrous metal core and being connected to produce a first signal across said coil in the absence of a received combination area and a second signal across said coil in the presence of a received combination area and*

*a tuned circuit connected to produce a first output in response to the first signal across said coil and a second output in response to the second signal across said coil;*

*said received combination being represented in a form comprising at least one magnetically reactive received combination area adjacent to and within the magnetic field of said coil to cause said second signal to be produced across said coil, said second output signal providing at least part of a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*8. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of received combination area and a received second signal across said coil in the presence of a combination area and*

*a tuned circuit connected to produce a first output corresponding to the first signal across the respective coil and a second output corresponding to the second signal across the respective coil;*

*said received combination being represented in a form comprising at least one magnetically reactive received combination area adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*9. An independently operable electronic lock and system having an alterable combination, said lock being operable in response to a correct information, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a circuit connected to produce a first output in response to the first signal across the respective coil and a second output in response to the second signal across the respective coil;*

*said received combination being represented in a form comprising at least one magnetically reactive received combination area adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*10. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising a plurality of sensor coils connected to receive the output of an oscillator, each coil having a ferrous metal core and being connected to produce a first signal across said coil in the absence of a received combination area and a second signal across said coil in the presence of a received combination area and*

*a circuit connected to produce a first output corresponding to the first signal across the respective coil and a second output corresponding to the second signal across the respective coil;*

*said received combination comprising at least one magnetically reactive received combination area adjacent to and within the magnetic field of at least one of said sensor coils to cause said second signal to be produced across said at least one coil, said first and second output signals providing a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*11. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*means within said housing for receiving and detecting a first received combination, comparing said first received combination with said stored combination information, and generating an activation signal when a comparison is favorable;*

*said receiving and detecting means comprising at least one sensor coil connected to receive the output of an oscillator, said coil having a ferrous metal core and being connected to produce a first signal across said coil in the absence of a received combination area and*

*a second signal across said coil in the presence of a received combination area and*

*a circuit connected to produce a first output corresonding to the first signal across said coil and a second output corresponding to the second signal across said coil;*

*said received combination being represented in a form comprising at least one magnetically reactive received combination area adjacent to and within the magnetic field of said coil to cause said second signal to be produced across said coil, said second output signal providing at least part of a second combination corresponding to said first combination;*

*means within said housing adapted to operate said securing means in response to said activation signal;*

*means within said housing for changing said stored combination information to said received combination when a comparison is favorable; and,*

*an energy source connected to supply the power requirements of said lock and system.*

*12. An independently operable electronic lock and system having an alterable combination, said lock being operable in response to a correct combination, comprising:*

*a lock housing adapted to be secured to a door;*

*securing means connected to said housing;*

*alterable memory means within said housing storing combination information for operating said lock;*

*at least one sensor coil within said housing connected to receive the output of an oscillator, said coil having a ferrous metal core and being connected to produce a first detection signal across said coil corresponding to lack of proximity to said coil of a combination area of a first received combination representation and a second detection signal across said coil corresponding to proximity to said coil of a combination area of said first received combination representation;*

*a circuit connected to produce a first comparison signal corresponding to the first detection signal across said coil and a second comparison signal corresponding to the second detection signal across said coil;*

*said received combination representation being in a form comprising at least one magnetically reactive received combination area causing, by at least the temporary proximity of said area to said coil within the magnetic field of said coil, said second detection signal to be produced across said coil, said second comparison signal providing at least part of a second combination representation corresponding to said first received combination representation;*

*means within said housing for comparing said second combination representation with said stored combination information and generating an activation signal when a comparison is favorable;*

*means within said housing adapted to operate said securing means in response to said activation signal;*

*means within said housing for changing said stored combination information to correspond to said received combination representation when a comparison is favorable; and,*

*an energy source connected to supply the power requirements of said lock and system.*

* * * * *

UNITED STATES PATENT AND TRADEMARK OFFICE

CERTIFICATE OF CORRECTION

PATENT NO. : Re. 29,846

DATED : November 28, 1978

INVENTOR(S) : Leonard J. Genest et al.

It is certified that error appears in the above-identified patent and that said Letters Patent are hereby corrected as shown below:

Column 5, line 19, after "bolt" insert --by--.

Column 6, line 25, after "microswitch" insert --arm--.

Column 9, line 24, delete the word "would" and insert in lieu thereof --wound--.

Column 14, line 53, delete the word "a" and insert in lieu thereof --at--.

Column 15, line 11, delete the second occurrence of the word "at".

Signed and Sealed this

Ninth Day of October 1979

[SEAL]

*Attest:*

RUTH C. MASON
*Attesting Officer*

LUTRELLE F. PARKER
*Acting Commissioner of Patents and Trademarks*